United States Patent Office 3,366,589
Patented Jan. 30, 1968

3,366,589
HOT MELT COATING COMPOSITION CONTAINING WAX, POLYETHYLENE, AND A COPOLYMER OF ETHYLENE AND ETHYL ACRYLATE
Irving P. Hammer, Nutley, N.J., and Frank J. Taranto, Flushing, N.Y., assignors to Mobil Oil Corporation, a corporation of New York
No Drawing. Continuation-in-part of application Ser. No. 179,232, Mar. 12, 1962. This application Apr. 27, 1966, Ser. No. 545,576
6 Claims. (Cl. 260—28.5)

ABSTRACT OF THE DISCLOSURE

Improved wax coating compositions are provided which comprise a major proportion of petroleum wax; 10–20% by weight of a copolymer containing from about 70 to about 85% by weight of ethylene and from about 30 to about 15% by weight of ethyl acrylate; and about 23–33% by weight of polyethylene having a molecular weight from about 1,000 to about 100,000.

This application is a continuation-in-part of application Ser. No. 179,232, filed Mar. 12, 1962, and now abandoned.

This invention is directed to a plastic formulation for coating paper, cardboard, cartons and the like and is particularly concerned with a coating composition for use in coating milk and juice containers.

Many items are now packaged in paper and cartons which were formerly transported in bottles and boxes. In order to provide a leakproof container, the package is presently coated with a layer of paraffin wax. While substantial volumes of paraffin wax have been used for this purpose, certain defects in the wax coated container have annoyed the manufacturer and user of these packages. Continuous effort has been made through the years to improve wax formulations by refinery treatment or additions to the wax or both and considerable improvement in the coating wax has been made. In spite of the improvement made in the past, substantial improvement is still necessary. A new type of coating composition, having substantially different or improved properties from wax is needed to satisfy both the container industry and the buying public.

For bread wraps and paper sealed food containers, the coating composition must be transparent to show printed matter, capable of being used as a heat seal and must not flow even when packaged hot. The coating formation must show considerable ductility, even at low temperature, and must show high tensile strength. The coated paper or board must have flexibility and be capable of being bent back on itself many times without flaking, chipping or cracking. For coating milk containers, the coating composition must provide low temperature ductility and yet provide a hard surface even at elevated temperatures. Of course, the composition must not flake in the milk container and must not scuff or rub off on shelves or tables when rubbed across such a surface. The appearance of the coated surface must be smooth and clear with a high gloss. The composition must not feel waxy when grasped by the consumer. This represents a formidable array of requirements, all of which have not been enumerated, and which are not satisfied by the present wax coating formulations.

It has been known in the past to mix polyethylene in wax to improve the properties of the coating. The amount of polyethylene generally used has been limited to a very small amount such as 0.1 to 0.2% by weight of the composition because of difficulty in forming a solution of wax and polyethylene. The ductility and heat sealability of the wax is improved by the addition of even small amounts of polyethylene. The polymer also improved the tensile strength of the wax. Unfortunately, at the low concentration of polyethylene generally used in ordinary wax, the flexibility is not substantially improved. The feel of the coated board is, furthermore, not satisfactory, being essentially waxy in nature.

It is an object of this invention to provide an improved coating formulation for paper and carton board.

A further object of this invention is to provide an improved dairy coating formulation for application to milk cartons of paperboard.

A further object of this invention is to provide an improved coating formulation for application to milk cartons to provide a flexible container which does not crack, flake or rub off and which has a non-greasy feel providing improved handling ability.

Another object is to provide wax coating compositions containing copolymers and polyethylenes, the compositions having excellent blend compatibility.

These and other objects of this invention will be more fully disclosed in the following more detailed description of the invention.

This invention comprises a mixture in critical amounts of petroleum wax, a high molecular weight interpolymer (or copolymer) containing ethylene and ethyl acrylate, and a high molecular weight polymer of ethylene. The formulation must contain the three components described above and may in addition include as a fourth component polyterpene resin.

The suitable amounts of each constituent are enumerated hereinbelow in Table I as follows:

TZBLE I

| Components | Type A, percent by weight | Type B, percent by weight |
|---|---|---|
| Petroleum Wax | 85–35 | 85–35 |
| Copolymer | 5–25 | 5–25 |
| Polyethylene resin | 10–40 | 3–39 |
| Polyterpene resin |  | 7–1 |

Coating compositions made by melting and mixing together the ingredients enumerated in Table I demonstrate unusual characteristics and are not at all like the individual components. They possess a high gloss, an unusual plastic feel and attractive appearance, high ductility and extreme high flexibility. This quality of high flexibility may be measured as the number of times a paperboard coated with the material may be bent back on itself without showing signs of cracks or breaks at the bend line. The formulations of this invention are unusual in this respect.

It has been found that compatibility of ethylene-ethyl acrylate copolymers with the wax and polyethylenes of the new compositions, is superior to that exhibited by other copolymers of ethylene and other ethylenic compounds. This makes possible more uniform coatings when the compositions are applied to substrates such as carton stock. Additionally, the new compositions have excellent gloss and gloss retention characteristics. The foregoing properties, namely, excellent compatibility, gloss and gloss retention, result in superior curtain coating compositions, since the possibility of blend incompatibility, which produces poor runability (on a machine), substrate coverage and the like, is eliminated. The compositions have such compatibility that they are stable when stored for extended time intervals; that is, there is little or no tendency of the individual components to separate one from the other during storage.

Selected runs of a series of test runs made with different formulations during the development of the products of this invention are shown in Table II below. The Flex Test values included in Table II were determined in the following maner. A wax composition was injection molded, cut to specimen size approximating 1/16-inch in thickness and 3/4-inch in length and having a "bow tie" shape. A specimen so cut was secured and was subjected to a reciprocating roller which flexed the specimen 90 degrees or 180 degrees, as desired. A counter, interconnected with the roller, indicated the number of cycles necessary to produce failure of the specimen.

15,000 to about 25,000 (Staudinger). The polyethylene referred to in Table II has a molecular weight of about 25,000.

With respect to the ethylene-ethyl acrylate copolymers, the amount of ethyl acrylate varies from about 15–30 percent by weight and the ethylene from about 85–70 percent by weight. The copolymer used in Table II has a comonomer ratio (weight percent) ethylene/ethyl acrylate of about 82/18, a Melt Index of 6, a tensile strength of

TABLE II.—PROPERTIES OF WAX-POLYMER BLENDS

| Run No | 1 | 7 | 6 | 13 | 14 | 18 |
|---|---|---|---|---|---|---|
| Composition: | | | | | | |
| 133/135° F. AMP Paraffin Wax | 100 | 57.0 | 57.0 | 57.0 | 57.0 | 57.0 |
| Copolymer | | | 43.0 | 10.00 | 20.0 | 20.0 |
| Polyethylene | | 43.0 | | 33.0 | 23.0 | 18.0 |
| Polyterpene | | | | | | 5.0 |
| Viscosity at 325° F. (Centipoises) | 1 3.0 | 1,920 | 10,320 | 2,480 | 3,580 | 2,800 |
| Properties at 40° F.: | | | | | | |
| Tensile, p.s.i. | 507 | 975 | 1,214 | 1,160 | 1,000 | 1,068 |
| Elongation, inches | 0.022 | 0.030 | 0.055 | 0.047 | 0.047 | 0.056 |
| Properties of Applied Film: | | | | | | |
| Gloss | (2) | (3) | (2) | (3) | (3) | (3) |
| Feel | (4) | (5) | (5) | (5) | (5) | (5) |
| Exudation after 12 hours | Nil | Nil | Heavy | Nil | Trace | Nil |
| Flex Test: | | | | | | |
| 90° Bend 6 | | 1 | | 36 | 300 | 200 |
| 180° Bend 6 | | 1 | | 1 | 8 | 7 |

1 At 210° F.
2 Good.
3 Excellent.
4 Waxy.
5 Dry.
6 Each value represents an average of ten (10) determinations.

Referring to Table II, it is seen that Run No. 1 was made using only a petroleum wax used quite frequently in the past for coating purposes. This is seen to be a good coating wax of high tensile strength viz 507 p.s.i. the elongation, 0.022 inch, is good for a wax but unfortunately not good enough to provide the type of coating required. The gloss is good but the feel is waxy. There is no substantial exudation or production of oily liquid on the surface of the coating when using a good coating wax.

Run No. 7 shows the result of a two component blend using wax and polyethylene as the components. The applied film has excellent gloss and does not exude. However, the flex, as indicated by elongation data, is only slightly better than straight wax, and is shown to be poor in the Flex Test.

Run No. 6 shows the use of an ethylene-ethyl acrylate copolymer in a two component blend. It is seen that the exudation in this instance is heavy.

Run No. 13 is an example of a three-component blend using same ethylene-ethyl acrylate copolymer at a concentration of 10 percent. The composition is shown to be excellent in all respects. In the Flex Test, it is substantially superior to the composition of Run 7.

Run No. 14 is similar to Run 13 but with an increased copolymer content. It is noted that only a trace exudation occurs, and that the flex characteristics are improved tremendously.

Run No. 18 shows the effect of the polyterpene resin in completely eliminating the exudation problem, and in maintaining excellent flex characteristics.

The selection of the wax for use in the formation of plastic coatings is of course important. It has long been recognized that improvements can be obtained by combining suitable paraffin waxes having melting points of about 120–150° F. with small amounts of selected microcrystalline waxes having melting points of about 150–200° F.

The polyethylene, used in these formulations, contributes to the gloss of the coatings. While molecular weight of the polyethylene used may vary broadly from about 1000 to about 1,000,000, the preferred range is from about 1350 pounds per square inch, a density (grams per cubic centimeter) of 0.931.

A hydrocarbon resin identified as Piccolyte S–100 has been found to be useful as the polyterpene resin (also referred to as a hydrocarbon thermoplastic terpene resin) used to prevent exudation in the new formulations. This is the polyterpene shown in Table II. Other polyterpene resins can be used for this purpose. The exudation problem can also be minimized by the proper selection of wax or waxes and the use of the prescribed amounts of copolymer and ethylene in conjunction with the wax.

The examples given above are merely for use in illustrating the invention and are not intended to limit the invention. The only limitations intended are found in the attached claims.

We claim:
1. A wax composition comprising
    a major proportion of petroleum wax,
    about 10–20% by weight of a copolymer containing from about 70 to about 85% by weight of ethylene and from about 30 to about 15% by weight of ethyl acrylate, and
    about 23–33% by weight of polyethylene having a molecular weight from about 1000 to about 100,000.
2. A wax composition according to claim 1 wherein the petroleum wax is paraffin wax.
3. A wax composition according to claim 1 wherein petroleum wax comprises paraffin wax having a melting point of about 120–150° F. and microcrystalline wax having a melting point of about 150–200° F.
4. A wax composition according to claim 1 wherein the ethylene polymer has a molecular weight of about 25,000.
5. A wax composition according to claim 1 containing in approximate parts by weight:

(a) paraffin wax 133/135° F. AMP _____ 57
    (b) a copolymer containing from about 70 to about 85% by weight of ethylene and from about 30 to about 15% by weight of ethyl acrylate _____ 20
    and (c) polyethylene having a molecular weight of about 25,000 ———————————————— 23

6. A wax composition according to claim 1 containing in approximate parts by weight:

(a) paraffin wax, 133/135° F. AMP ———————— 57
(b) a copolymer containing from about 70 to about 85% by weight of ethylene and from about 30 to about 15% by weight of ethyl acrylate ———————— 20
(c) polyethylene having a molecular weight of about 25,000 ———————————————— 18 and (d) polyterpene resin ———————————————— 5

References Cited

UNITED STATES PATENTS

| | | | |
|---|---|---|---|
| 2,523,705 | 9/1950 | Lovell et al. | 260—28.5 |
| 2,953,541 | 9/1960 | Pecha et al. | 260—897 |
| 3,025,167 | 3/1962 | Butler | 260—28.5 |
| 3,155,631 | 11/1964 | Zapp | 260—28.5 |
| 3,205,186 | 9/1965 | Zaayenga | 260—28.5 |
| 3,215,657 | 11/1965 | Beresniewicz | 260—28.5 |
| 3,275,494 | 9/1966 | Brunson et al. | 260—897 |

FOREIGN PATENTS 1,389,415  1/1965  France.

MORRIS LIEBMAN, *Primary Examiner.*

B. A. AMERNICK, *Assistant Examiner.*

UNITED STATES PATENT OFFICE
CERTIFICATE OF CORRECTION

Patent No. 3,366,589                              January 30, 1968

Irving P. Hammer et al.

It is hereby certified that error appears in the above numbered patent requiring correction and that the said Letters Patent should read as corrected below.

Column 1, line 50, for "formation" read -- formulation --; column 2, line 33, for "Tzble" read -- Table --; line 68, for "llttle" read -- little --; column 3, line 75, for "1000,000" read -- 100,000 --.

Signed and sealed this 29th day of April 1969.

(SEAL)
Attest:

Edward M. Fletcher, Jr.                         EDWARD J. BRENNER
Attesting Officer                                   Commissioner of Patents